United States Patent [19]

Heindke et al.

[11] Patent Number: 4,655,446
[45] Date of Patent: Apr. 7, 1987

[54] STORAGE COMPARTMENT FOR DOCUMENTS

[75] Inventors: Armin Heindke; Joachim Radtke, both of Villingen-Schwenningen, Fed. Rep. of Germany

[73] Assignee: Kienzle Apparate GmbH, Villingen-Schwenningen, Fed. Rep. of Germany

[21] Appl. No.: 699,668

[22] Filed: Feb. 8, 1985

[30] Foreign Application Priority Data

Feb. 10, 1984 [DE] Fed. Rep. of Germany ....... 3404751
Oct. 26, 1984 [DE] Fed. Rep. of Germany ....... 3441436

[51] Int. Cl.⁴ .......................................... B65H 29/22
[52] U.S. Cl. ................................... 271/314; 271/207; 271/215; 271/273; 271/297; 271/305
[58] Field of Search ............... 271/314, 177, 127, 213, 271/214, 215, 216, 122, 294, 273, 274, 207, 297, 303, 305; 414/48, 49, 106, 107, 108, 109; 53/542, 520

[56] References Cited

U.S. PATENT DOCUMENTS

| 4,441,702 | 4/1984 | Nagel et al. ......................... 271/177 |
| 4,447,167 | 5/1984 | Euteneuer et al. ............. 271/177 X |
| 4,449,812 | 5/1984 | Furuichi et al. ................. 271/294 X |

FOREIGN PATENT DOCUMENTS

| 2939208 | 4/1981 | Fed. Rep. of Germany ...... 271/274 |
| 8302348 | 7/1983 | Int'l. Pat. Institute ............. 271/273 |
| 0175640 | 10/1982 | Japan ................................... 271/274 |

OTHER PUBLICATIONS

Beuch, W. E. et al., "Compensating Armature Pressure Roll Device, IBM Technical Disclosure Bulletin, vol. 18, No. 7, Dec. 1975, pp. 2242-2243.

Primary Examiner—Richard A. Schacher
Attorney, Agent, or Firm—Toren, McGeady and Goldberg

[57] ABSTRACT

A storage compartment can be used selectively as an individual compartment attached to a document processing device or as one of several compartments joined together in a sorting device. The compartment is functionally autonomous so that its component parts, which are drive and pressure rollers (23, 24, 25, and 27) for conveying documents supported on a base plate (1) and a motor (40) and electrical coupling for actuating the rollers, are all connected to the base plate (1). The only mechanical connection between the compartment and a document processing device or other compartments in a sorting device is by a plug (28) for electrical connection. Special shaping of the base plate (1) facilitates space-saving packaging of several compartments.

3 Claims, 3 Drawing Figures

STORAGE COMPARTMENT FOR DOCUMENTS

The invention is directed to a storage compartment for documents for selective utilization as an individual compartment attachable to a document processing device or to a sorting device for combination with a plurality of identical modules, comprising a base plate and drive and pressure rollers for the documents connected with said base plate, which convey the document into the storage compartment.

In document processing apparatus there is often the desire to combine it either only with a single storage compartment, in such a way that all the processed documents are stored in one single compartment, or to attach a sorting device which permits to store the documents in accordance with a specific orientation schematic. In the known document processing apparatus the individual compartments and the sorting devices were respectively separate and designwise differently conceived structural units, which could be selectively combined with the document processing apparatus.

It is the task of the invention to create a storage compartment for documents, which is attachable as an individual compartment at the document processing device, but which can also be assembled into a sorting device which can be attached at the outlet of a document processing apparatus. A further goal of the invention is to conceive the storage compartment for the documents in such a way that it is connectible with the document processing device or the sorting device with the least possible expenditure of labor. Hereby it is, at the same time, of value that the storage compartment is designed with a minimum of parts and can, however, function, so to speak, independently.

The storage compartment according to the invention is characterized in that the driving rollers are driven by a motor connected with a base plate and that the pressure rollers are brought into engagement with the driving rollers by electrical coupling means, in such a way that the storage compartment is connected with the document processing device or sorting device by means of an electrical plug connection itself connected with the base plate.

Furthermore, according to the invention the electrical coupling means consists of an electromagnet which actuates a rocking lever by an armature which rocking lever carries the pressure rollers.

The base of the storage compartments is naturally in the shape of a rectangle, if the documents are stored supported on their longitudinal edge. For reasons of the functional dependability it could, however, be expedient to provide a funnel-shaped inlet opening between the fixed rear partition of the storage compartment and a movable front partition, in order to prevent a mutual bunching up of the documents during insertion. In such a case a space-saving design of the storage compartment is possible in that the base plate deviates from the rectangular shape of the document pile in such a way, that the rearward protuberance for the arrangement of the conveyance means is provided in the vicinity of the document passage, to which corresponds a recess at the front side and that a protuberance exists provided for the support of the frontal compartment boundary, to which corresponds a recess at the rear side, so that any number of document storage compartments can be joined together in a space-saving way.

It is achieved in this manner and fashion that, in spite of the funnel-shaped insertion opening for the documents prior to reaching the document pile proper, the base plate of the document storage compartment is designed so that dead space is avoided, so that thus the sorting device with its storage compartment can be constructed as small as possible and therefore can also be located on a table.

The invention will now be described with particularity with reference to the attached drawings.

Figure 1:
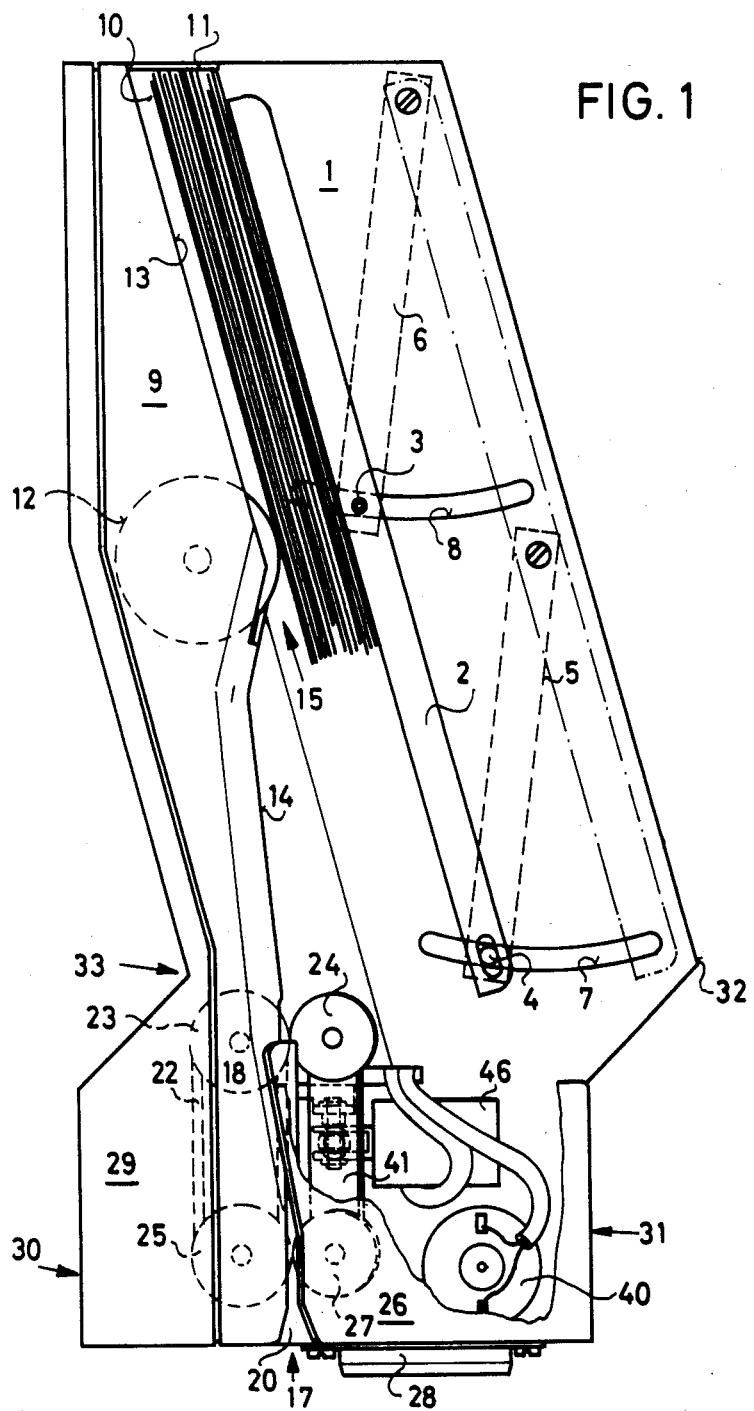
FIG. 1 is a plan view of the document storage compartment.

A movable, front compartment boundary 2 is arranged on a base plate 1. This compartment boundary 2 is connected with rocking levers 5 and 6 by means of studs 3 and 4, which are acted upon in clockwise direction below the base plate 1 by means of springs which are not shown here. The studs 3 and 4 protrude through guidance slits 7 and 8 and lead the compartment boundary 2 from the middle position shown in solid lines into an outer position, in which the compartment is full, which is shown with dotted lines. The springs, which act upon the support levers 5 and 6, are in any case so weak, that the front compartment boundary 2 can be easily displaced from the original position into its end position.

On the other side of the movable frontal compartment boundary 2 there exists a fixed rear partition 9, between which the documents 10 are retained. At the rear partition 9 an additional boundary surface 11 for the documents has been provided in the direction of insertion. A conveyance roller 12 with suitable frictional layers drives the documents 10 respectively up to the right side-boundary 11.

The rear partition 9 is vertical in its rear portion 13, so that a square-shaped storage compartment results here between the front compartment boundary 2 and the portion 13 of the rear partition 9. The rear partition 9 is provided with a funnel-shaped converging portion 14 in its front portion, which converges to the straight portion 13 of the rear partition, so that a funnel-shaped entrance portion 15 for the storage compartment results between the portion 14 and the frontal compartment boundary 2.

Figure 2:
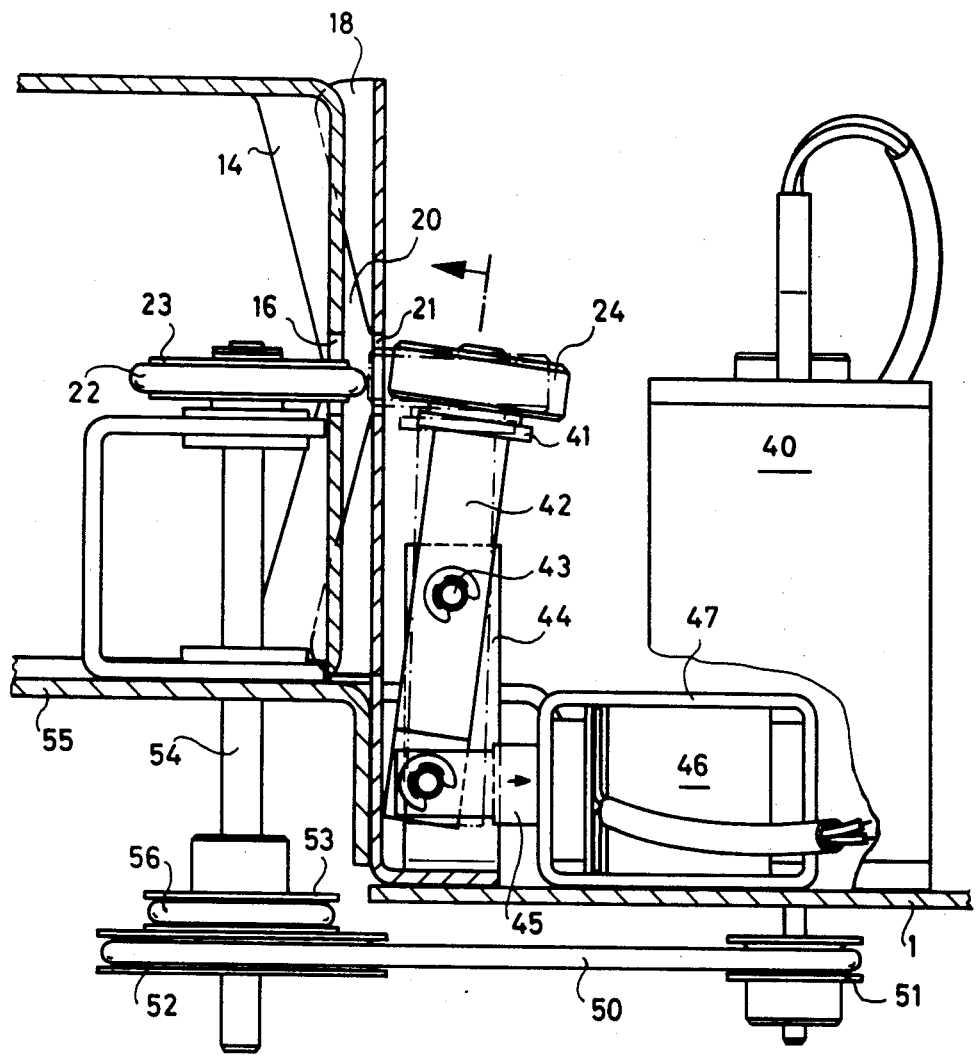
FIG. 2 is a side view of the document conveyance means.

Contrary to the portion 13, the portion 14 of the rear partition 9 does not run vertically in FIG. 1 viewed from above, rather, as this is shown in particular in FIG. 2, it is arched in the rearward direction and provided with a clearance 16 at the highest point of the arch. Correspondingly, the arched guidance fitting 18 at the entrance opening 17 for the documents stands opposite to the rearwardly arched portion 14 of the rear partition 9, so that the passage 20 for the documents results between the portion 14 of the rear partition 9 and the guidance fitting 18, which imparts a rearwardly arched shape to the documents 10.

At the highest point of the arch the inlet fitting 18 is also provided with a recess 21. Through the recesses 16 and 21 a conveyance belt 22, which is arranged upon a conveyance roller 23, and a pressure roller 24 act upon each other. As can be seen from FIG. 1, the conveyance belt 22 is also wound around a conveyance roller 25, which is driven by a drive motor 40 just as is the case with the conveyance roller 23, which is located in the housing portion 26. The motor 40 drives the shaft 54 by means of a belt 50 and the belt wheels 51, 52, 53, which moves the belt wheel 23 and thus the belt 22 by frictional contact. The belt wheel 53 moves also the conveyance roller 12 by means of a belt 56. The two pressure rollers 24 and 27 are partially also supported in the housing portion 26, and indeed upon a connecting member 41, which is attached to a rocking lever 42. The rocking lever 42 is supported upon a bolt 43, which is retained at the fixed support portion 44. The armature 45 of the electromagnet 46 is connected with the rocking lever 42 in an articulated manner, said electromagnet being located in a retaining- and concluding part 47. The electromagnet 46 pivots therefore the rollers 24 and 27 from the non-effective, retracted position into the actuating position. The relative dimensions between the contact point between 23 and 24 on the one hand and the inlet 15 on the other hand are chosen so that the shortest possible document has already moved between the lastly guided document, while the first one is still retained between 23 and 24. The design of the storage compartment is therefore of the type, that documents of different lengths can be randomly processed and stored.

The current supply for the drive motor 40 and the electromagnet 46, which pivots the pressure rolls 24 and 27, occurs through a plug-in part 28, which is attached at the base plate 1 and represents the only mechanical connection to the document encoder itself, so that the storage compartment can be easily installed at the document encoder, whereby merely the plug-in part 28 must be inserted into a corresponding socket portion at the document encoder.

Figure 3:
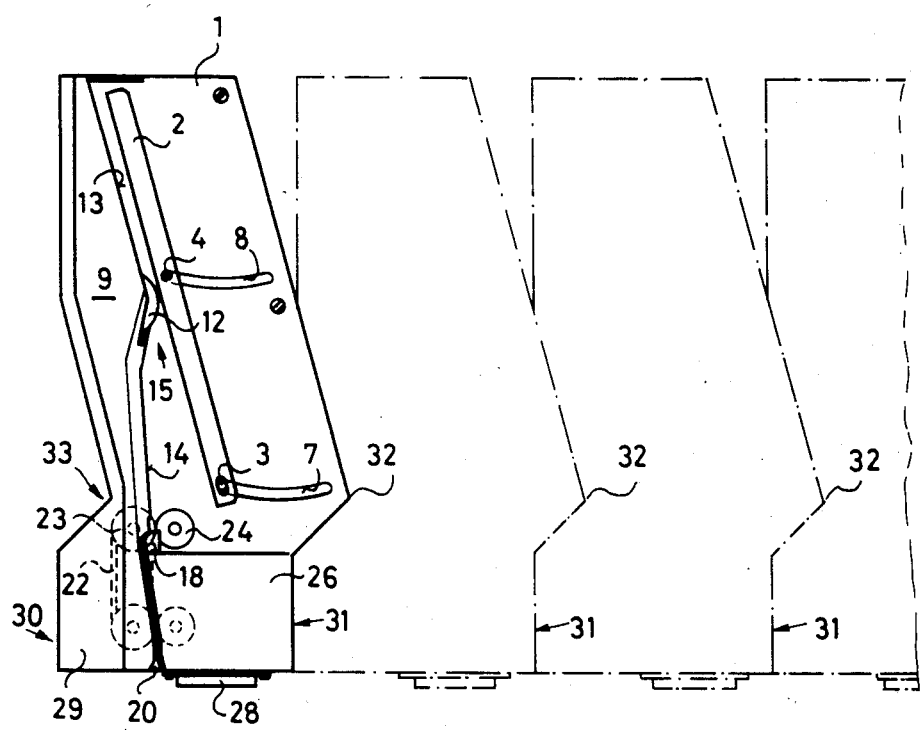
FIG. 3 shows the joining together of several storage compartments.

The plan view in FIG. 1 shows that the base plate 1 of the document storage compartment deviates considerably from the rectangular shape, which in itself contradicts a pile-shaped grouping of several document storage compartments into a sorting device. That this is still possible results from the special shape of the base plate and the housing, as can be recognized from FIG. 3.

The base plate 1 is provided with a rearward protuberance 30 in the vicinity of the inlet opening 17, which is covered with a housing portion 29. The angle-shaped part 55 is a component of the base plate 1. At this protuberance 30 as well as at the housing part 26 the drive means 40 for the document are arranged. The base plate 1 is provided at its front side with a corresponding recess 31 and with a protuberance 32 in order to make possible a parallel displacement of the compartment boundary 2, as this results from FIG. 1 at the rear side a recess 33 corresponding to the protuberance 32 is provided, so that, as can be easily seen in FIG. 3, the individual document storage compartments can be joined together and all of them lie with their plug-in parts 28 at a conveyance path determined by the sorting module, which is parallel to the plug-in parts 28.

We claim:

1. A storage compartment device for selective use as an individual compartment attachable to a document processing device or for combination with a plurality of identical modules into a sorting device, comprising a base plate, a storage compartment formed on the base plate, means for conveying the documents from an inlet side of the base plate into the storage compartment, the conveying means including drive rollers and pressure rollers, a motor attached to the base plate for driving the drive rollers, the pressure rollers mounted on a rocking lever pivotable between a first position in contact with the drive rollers and a second position swung away from the drive rollers, electromagnetic coupling means for pivoting the pressure rollers between the first and second positions, a housing member mounted on the base plate for housing the motor and coupling means, wherein the electric current supply for the motor and the electromagnetic coupling means is effected through a plug-type member connected to the base plate, the plug-type member forming the only mechanical connection to the document processing device or sorting device.

2. A storage compartment according to claim 1, wherein the electromagnetic coupling means comprises an electromagnet including an armature which acts on the rocking lever.

3. A storage compartment according to claim 1, wherein the base plate has a rearward side facing the drive rollers and a forward side facing the pressure rollers, the base plate deviating in such a way from the rectangular shape determined by the document pile that a protuberance formed on the rearward side for the attachment of the conveying means is provided in the vicinity of the inlet side of the base plate, and a recess which corresponds in shape to the protuberance is formed at the forward side, and that another protuberance exists at the forward side of the base plate for supporting a compartment boundary wall adjacent the forward side, and another recess formed at the rearward side which another recess conforms in shape to the another protuberance, so that a random quantity of storage compartments can be joined together in a space-saving manner.

* * * * *